(12) United States Patent
Isham

(10) Patent No.: US 6,977,489 B2
(45) Date of Patent: Dec. 20, 2005

(54) MULTIPHASE CONVERTER CONTROLLER USING SINGLE GAIN RESISTOR

(75) Inventor: Robert H. Isham, Flemington, NJ (US)

(73) Assignee: Intersil Americas, Inc, Milpitas, CA (US)

( * ) Notice: Subject to any disclaimer, the term of this patent is extended or adjusted under 35 U.S.C. 154(b) by 158 days.

(21) Appl. No.: 10/701,878

(22) Filed: Nov. 5, 2003

(65) Prior Publication Data

US 2004/0135566 A1    Jul. 15, 2004

Related U.S. Application Data

(60) Provisional application No. 60/439,116, filed on Jan. 10, 2003.

(51) Int. Cl.[7] .................................................. G05F 1/59
(52) U.S. Cl. ........................................ 323/272; 363/65
(58) Field of Search ............................ 323/272; 363/65

(56) References Cited

U.S. PATENT DOCUMENTS

| | | | |
|---|---|---|---|
| 6,246,220 B1 | 6/2001 | Isham et al. | |
| 6,278,263 B1 * | 8/2001 | Walters et al. | ............... 323/272 |
| 6,292,378 B1 | 9/2001 | Brooks et al. | |
| 6,674,274 B2 * | 1/2004 | Hobrecht et al. | ............ 323/285 |
| RE38,454 E * | 3/2004 | Walters et al. | ............... 323/272 |
| 6,839,252 B2 * | 1/2005 | Tai et al. | ......................... 363/65 |
| 6,891,736 B2 * | 5/2005 | Takemura et al. | ............. 363/65 |
| 6,897,636 B2 * | 5/2005 | Harris | ......................... 323/272 |
| 2002/0135338 A1 | 9/2002 | Hobrecht et al. | |

* cited by examiner

*Primary Examiner*—Jeffrey Sterrett
(74) *Attorney, Agent, or Firm*—Gary R. Stanford

(57) ABSTRACT

A controller for a multiphase converter including an error amplifier, a gain resistor, a current sense circuit and a gain adjust amplifier. The error amplifier generates an error signal based on an error voltage developed across a feedback resistance. The current sense circuit converts each of multiple sensed load currents into corresponding proportional voltages. The gain adjust amplifier circuit receives the proportional voltages and operates to apply at least one gain adjust voltage to the gain resistor to develop a gain adjust current that is applied through the feedback resistance to adjust gain. In one embodiment, the proportional voltages are time multiplexed or averaged to provide the gain adjust voltage(s). An IC integrating the multiphase converter need only include a single gain pin for coupling to a gain resistor to set gain for each phase.

20 Claims, 4 Drawing Sheets

MULTIPHASE CONVERTER CONTROLLER USING SINGLE GAIN RESISTOR

CROSS-REFERENCE TO RELATED APPLICATIONS

This application claims the benefit of U.S. Provisional Application No. 60/439,116 filed on Jan. 10, 2003, entitled "CURRENT SENSING CIRCUIT FOR DC-DC CONVERTER USING SINGLE EXTERNAL GAIN SETTING RESISTOR", which is herein incorporated by reference for all intents and purposes.

BACKGROUND OF THE INVENTION

1. Field of the Invention

The present invention relates to DC power supply systems, and more particularly to a controller for a multiphase DC-DC converter which employs a single external resistor for setting gain for multiple channels.

2. Description of the Related Art

Electrical power for an integrated circuit (IC) is typically supplied by one or more direct current (DC) sources. FIG. 1 is a simplified schematic and block diagram of a multi-phase buck-mode pulse width modulation (PWM) DC-DC converter 100 of prior art. The converter 100 includes a PWM controller 101 which provides multiple synchronous PWM signals PWM1, PWM2, PWM3 and PWM4 to four driver and switch circuits 103, individually labeled DSC1, DSC2, DSC3 and DSC4, respectively. Each driver and switch circuit 103 has an output coupled to a common output node 105, which develops an output signal VOUT applied to a load 107 and to a load reservoir capacitor 109, both referenced to a power supply rail (e.g., GND). The VOUT signal is fed back via a feedback resistor RFB to the PWM controller 101. Each of the driver and switch circuits DSC1, DSC2, DSC3 and DSC4 is coupled to the PWM controller 101 via a corresponding one of current sense resistors RS1, RS2, RS3 and RS4, respectively. Although the converter 100 shows four different driver and switch circuits 103 for implementing up to four phases, it is understood that a different number of phases may be employed.

Only the driver and switch circuit DS1 is described in further detail, where it is understood that all of the driver and switch circuits 103 are configured in substantially the same manner. The PWM1 signal is provided to a driver 111 of the driver and switch circuit DS1, where the driver 111 controls the turn-on and turn-off of a pair of electronic power switching devices 113 and 115. In particular, the driver 111 generates an upper gate switching signal UGATE provided to the control terminal (e.g., gate) of the upper (or high side) switch 113 and a lower gate switching signal LGATE provided to the control terminal of the lower (or low side) switch 115. In the particular configuration shown, the switches 113 and 115 are depicted as N-channel metal-oxide semiconductor field-effect transistors (MOSFETs) having their drain-source current paths coupled in series between a pair of power supply rails (e.g., VIN and ground (GND)). The drain of switch 113 is coupled to the source of switch 115 at a phase node 117, which is coupled to one end of an output inductor 119. The other end of the inductor 119 is coupled to the output node 105. The phase node 117 develops a signal PHASE fed back to the driver 111, where the PHASE signal is monitored for adaptive shoot-through protection and also provides a return path for the upper gate drive. The phase node 117 is also coupled to the sense resistor RS1 fed back to the PWM controller 101. The driver and switch circuits DSC2, DSC3 and DSC4 are configured in the same manner and are coupled to the current sense resistors RS2, RS3 and RS4, respectively, fed back to the PWM controller 101.

The PWM controller 101 includes a voltage error amplifier circuit 121, PWM logic 123 and a current sense circuit 125. The resistor RFB is coupled to the voltage error amplifier circuit 121 and the current sense resistors RS1–RS4 are coupled to the current sense circuit 125. The voltage error amplifier circuit 121 and the current sense circuit 125 are coupled to each other and to the PWM logic 123, which adjusts the duty ratio of the PWM1–PWM4 signals to maintain the node 105 within a prescribed set of parameters. The parameters might include, for example, a droop or gain parameter defining a fixed ratio amount that the voltage of VOUT decreases in response to increasing load current. One particularly useful circuit for performing this current sensing operation is disclosed in U.S. Pat. No. 6,246,220 entitled "Synchronous-Rectified DC to DC Converter With Improved Current Sensing" to Isham et al., which is assigned to the same assignee of the present application and which is incorporated herein by reference in its entirety (hereinafter referred to as the '220 patent).

FIG. 2 is a simplified schematic diagram of a portion of the PWM controller 100 implemented as described in the '220 patent (e.g., a portion of the current sense circuit 125 and the voltage error amplifier circuit 121). The illustrated circuit includes a virtual ground amplifier 201 having an inverting input coupled to node 202, which is coupled through a corresponding sense resistor RS1 (e.g., representing any of the current sense resistors RS1–RS4) to output node 105. The amplifier 201 has a non-inverting input coupled to ground and an output coupled to a control terminal of a variable impedance device, which is the gate of an N-channel field-effect transistor (NFET) 203 in the embodiment shown. The drain and source of the NFET 203 is coupled between the inverting input of the amplifier 201 and a sample and hold circuit 207 at a node 205.

The sample and hold circuit 207 is implemented with a pair of P-channel FETs P1 and P2, a capacitor C1 and a single-pole, single-throw (SPST) switch SW. The drain of P1 is coupled to a DC source voltage VCC and its gate and source are coupled together at one terminal of the switch S1 at node 205. The other terminal of the switch SW is coupled to the gate of P2 and to one end of the capacitor C1, having its other end coupled to VCC. The drain of P2 is coupled to VCC and its source is coupled to a node 209, which is further coupled to the inverting input of a voltage error amplifier 211 and to one end of the resistor RFB. The non-inverting input of amplifier 211 receives a reference voltage from a voltage source 213 (shown as a digital to analog converter or DAC), and the output of amplifier 211 is coupled to a node 215 to enable connection of a feedback RC circuit to node 209. The output of the amplifier 211 generates an error signal ERR which is provided to comparators (not shown) of the PWM logic 123 for controlling the output voltage VOUT.

In operation, the drain-source impedance of the NFET 203 is varied as controlled by the output of the amplifier 201 in a direction to hold one end of the resistor RS1 at virtual ground. The other end of the resistor RS1, coupled to the output node 105, is at a voltage equal to the load current (LC) times the on-state drain-to-source resistance (RDSON) of the low side switch of the corresponding driver and switch circuit 103, such as the switch 115. This causes current to flow through the NFET 203 that is equal to RDSON*LC/RS1 (where the asterisk "/" denotes multiplication and the forward slash "/" denotes division). The sample and hold circuit 207 samples this current flowing through the NFET 203 and applies it through resistor RFB, which causes a voltage drop across RFB equal to RDSON*LC*RFB/RS1. The current sense and sampling portion of the circuit 200 may be repeated for each of the other sense resistors RS2–RS4 to provide gain control for each of the four phases of the multiphase converter 100 in a similar manner.

In this manner, the gain (i.e., the amount that VOUT decreases relative to output current) is established by the ratio of the value of the applicable current sense resistor RSx (e.g., representing the resistors RS1–RS4) to the value of the feedback resistor RFB. The PWM controller 101 may be implemented on a separate integrated circuit (IC) in which the resistor RFB and each of the resistors RSx are external to that IC. Nodes 202, 209 and 215 are coupled to or otherwise form pins of the IC. This allows a user to adjust the values and ratios of these resistors to thereby adjust the gain of the converter 100. While this may be acceptable for a single channel device, it causes a relatively onerous pin requirement for a multiphase system. Note, for example, that instead of a single pin node 202, four separate pins 101a, 101b, 101c and 110d are required to connect the four separate resistors RS1–RS4, respectively, to the current sense circuit 125. In some configurations, the driver 111 may be incorporated within the same IC as the PWM controller 101, so that the phase node 117 is also internally available. Nonetheless, in the configuration shown, four separate current sense resistors and four separate pins 101a–101d would still be needed to provide the user the same flexible value and ratio adjustment.

SUMMARY OF THE INVENTION

A controller for a multiphase converter according to an embodiment of the present invention includes an error amplifier, a gain resistor, a current sense circuit and a gain adjust amplifier. The error amplifier generates an error signal based on an error voltage developed across a feedback resistance. The current sense circuit converts each of multiple sensed load currents into corresponding proportional voltages. The gain adjust amplifier circuit receives the proportional voltages and operates to apply at least one gain adjust voltage to the gain resistor to develop a gain adjust current that is applied through the feedback resistance to adjust gain. In one embodiment, the proportional voltages are time multiplexed to provide corresponding gain adjust voltages applied to the single gain resistor. Alternatively, the proportional voltages are averaged to provide an average value used as the gain adjust voltage.

The current sense circuit includes a sense resistor coupled to each phase node of the converter. In one embodiment, the current sense circuit includes a sense amplifier, variable impedance device and current sense translation resistor for each channel or phase of the converter. Alternatively, a switched sense amplifier circuit is provided and used for each phase. In either case, for each channel, a sense resistor is coupled to a virtual ground of a sense amplifier, which controls a variable impedance device to develop a current substantially equal to sensed load current through the sense resistor. The current through the variable impedance device is applied to a corresponding current sense translation resistor. A sample and hold circuit is provided for each phase to sample voltage across the corresponding current sense translation resistor for providing the proportional voltages.

The gain adjust amplifier may include select logic that selects among the proportional voltages, a gain adjust amplifier and a variable impedance device. In this case, the gain adjust amplifier has a first input coupled to the select logic and a second input coupled to the gain resistor. The variable impedance device has a control input coupled to an output of the gain adjust amplifier, a first current terminal coupled to the gain resistor and a second current terminal coupled to the error amplifier input. The proportional voltages are either time-multiplexed or averaged, and the result is applied by the gain adjust amplifier to the gain resistor to develop the gain adjust current through the variable impedance device. The gain adjust current is applied to the feedback resistance to adjust gain.

An integrated circuit (IC) incorporating a multiphase converter controller according to an embodiment of the present invention includes a feedback pin for coupling a feedback resistor, a gain pin for coupling a gain resistor, an error amplifier, pulse-width modulation (PWM) logic, multiple drivers, multiple sense resistors, a current sense circuit, and a gain adjust current generator. The error amplifier has a first input coupled to the feedback pin and an output that provides an error signal based on a voltage across the feedback resistor. The PWM logic develops a PWM signal for each phase based on the error signal. Each driver receives a corresponding PWM signal and has a corresponding phase node coupled to a corresponding sense resistor. The current sense circuit converts a current developed through each sense resistor into a corresponding one of multiple proportional load voltages. The gain adjust current generator receives the proportional load voltages and has a current-controlled output that develops a gain adjust current through the gain resistor by maintaining a selected proportional load voltage on the gain pin. The gain adjust current generator applies the gain adjust current through the feedback resistor via the feedback pin to adjust gain.

It is appreciated that the IC need only include a single gain pin to couple a gain resistor for setting the gain of each phase or channel of the multiphase converter.

A method of adjusting gain of a multiphase power converter includes generating a plurality of currents, each representative of a corresponding load current sensed at a corresponding one of a plurality of phase nodes, applying each representative current through at least one current sense translation resistor, sampling voltage developed across each current sense translation resistor and providing a plurality of sensed voltages each representative of a corresponding load current, selecting from among the plurality of sensed voltages to provide at least one gain adjust voltage, applying the at least one gain adjust voltage to a gain resistor to develop a gain adjust current through the gain resistor, and applying the gain adjust current through a feedback resistor to adjust gain. The method may include time multiplexing the sensed voltages or averaging the sensed voltages to providing an average voltage value. The method may include applying a gain adjust voltage to the gain resistor through a negative feedback path of an amplifier having an output controlling a variable gain device coupled in series with the gain and feedback resistors.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The inventors of the present application have recognized the need for reducing pin count of an IC employed to control a multiphase converter architecture. They have therefore developed a multiphase converter controller for a multiphase converter architecture which uses a single external gain setting resistor. A multiphase converter controller using a single gain setting resistor according to embodiments of the present invention enables the current sense resistors to be incorporated within the same IC so that a single gain resistor is shared among a plurality of channels (phases) of a multiphase DC-DC converter architecture. The load current of each channel is sensed by an internal sense resistor and coupled to a current sense translation resistor, which develops a proportional voltage which is a representation of the voltage sensed across the current sense resistor. The proportional voltage across the current sense translation resistor is time multiplexed or averaged and input to an amplifier. The amplifier drives a variable impedance device (e.g., FET) to maintain a voltage applied to the single shared external gain resistor, in which the applied voltage is based on or otherwise proportional to the voltage across the internal sense resistor. In this manner, the current output of the variable impedance device is comparable to the load current sensed at the phase node. The gain adjust current developed by the variable impedance device is applied to the feedback resistor to adjust the output voltage based on the load current.

In the configurations illustrated, the drivers are placed internal to the IC, so that each current sense resistor is incorporated on the IC and internally coupled to a corresponding phase node so that the external current sense pins otherwise required are eliminated. Instead, a single pin is used to couple an external gain resistor which is shared among all the channels.

Figure 1:
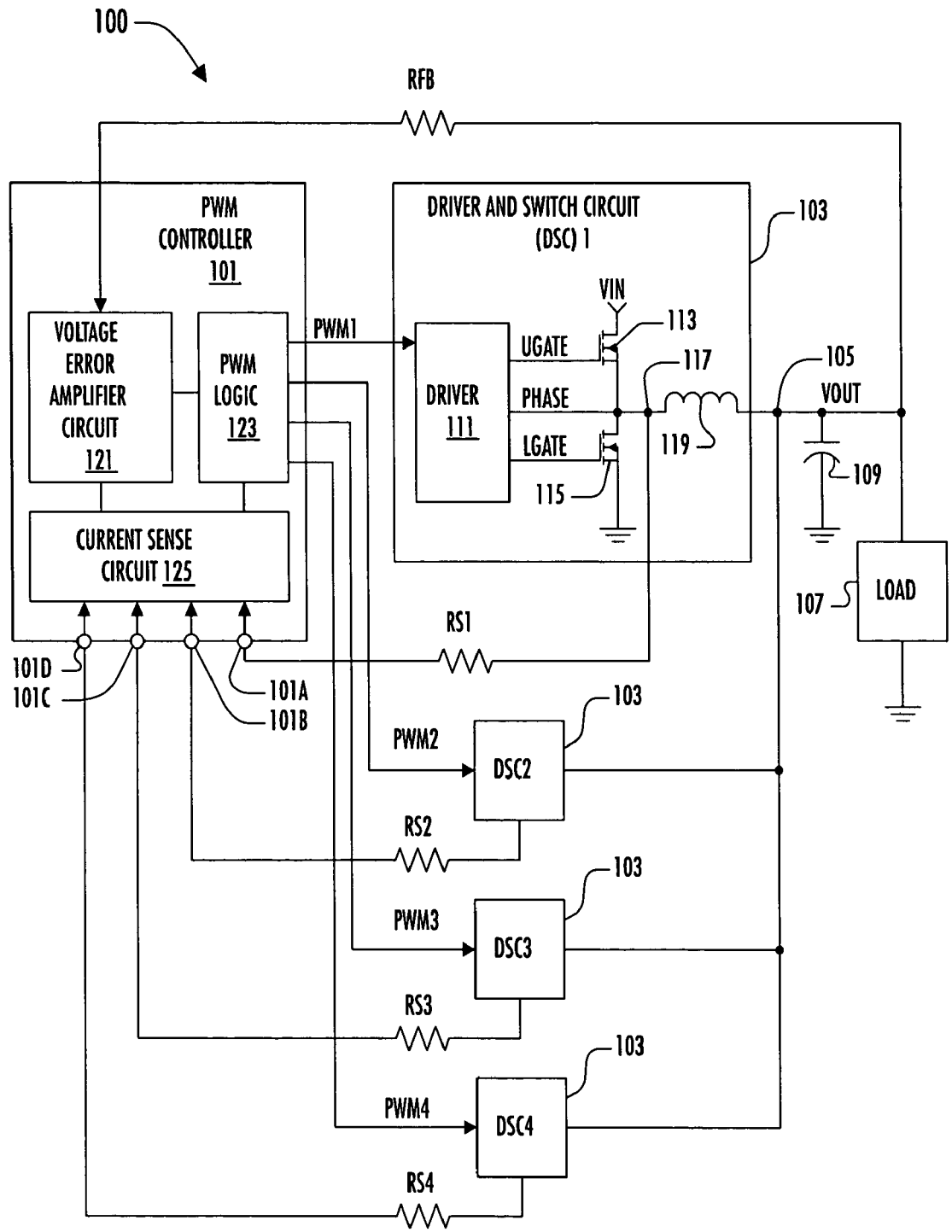
FIG. 1 is a simplified schematic and block diagram of a multi-phase buck-mode pulse width modulation (PWM) DC-DC converter of prior art.
Figure 2:
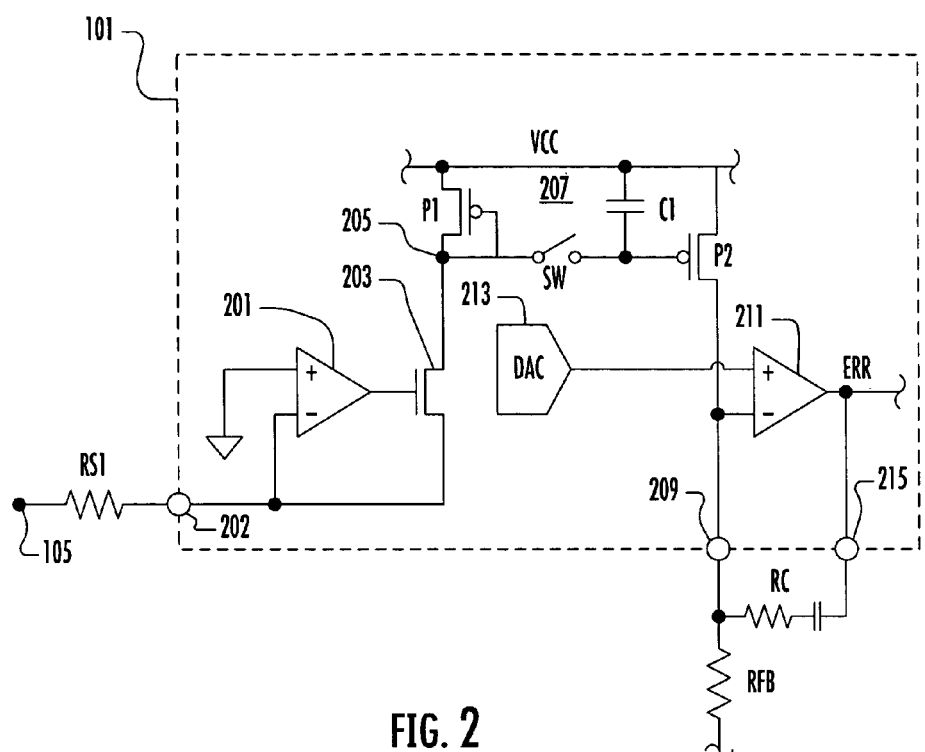
FIG. 2 is a simplified schematic diagram of a current sensing mechanism 200 described in a prior patent.
Figure 3:
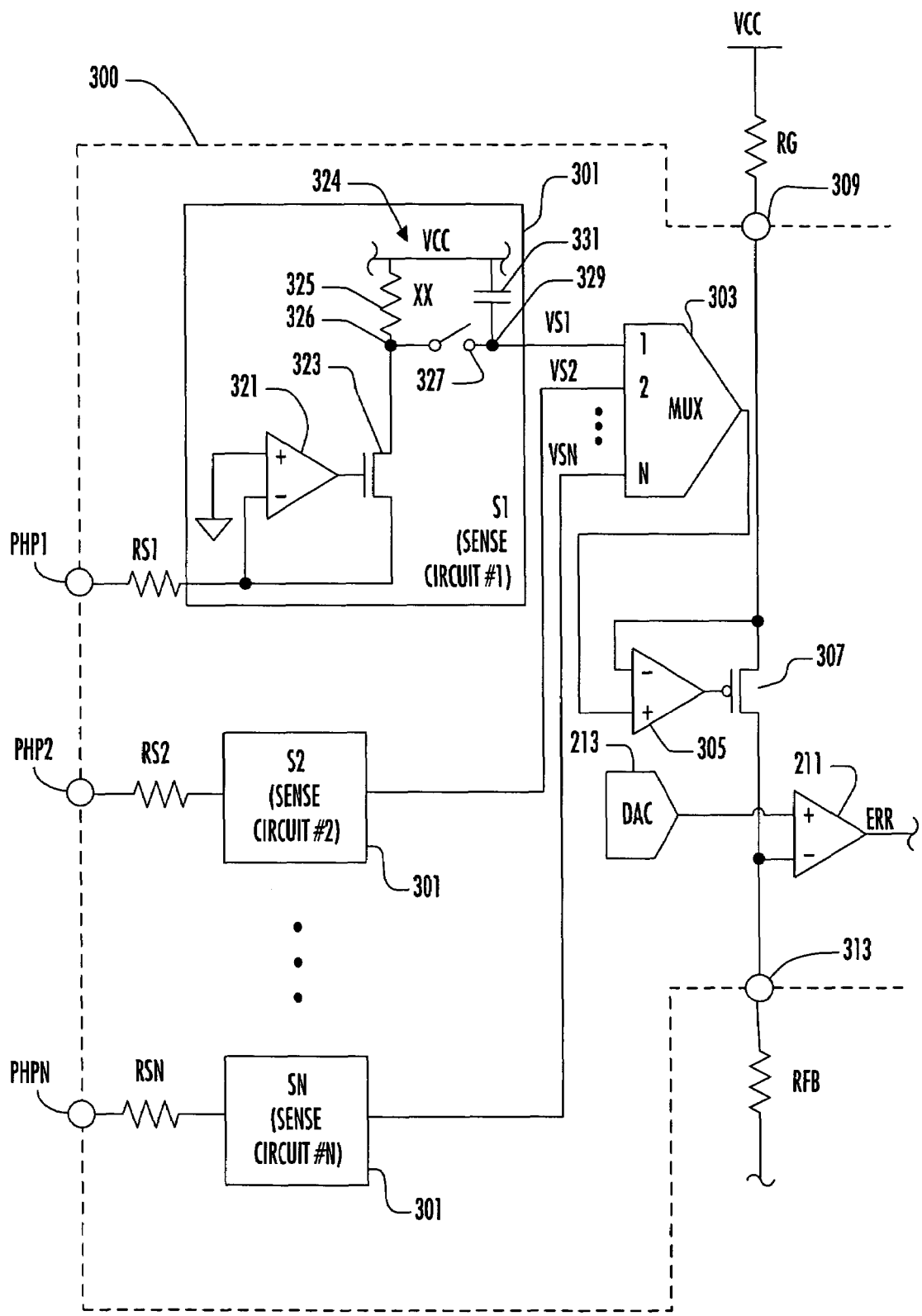
FIG. 3 is a schematic diagram of an IC of a multiphase DC-DC converter architecture incorporating a current sensing circuit implemented according to an exemplary embodiment of the present invention.

FIG. 3 is a partial schematic diagram of an IC 300 of a multiphase DC-DC converter architecture incorporating a multiphase converter controller implemented according to an exemplary embodiment of the present invention. Similar devices as those previously described are assigned the same reference numbers. Each driver (e.g., driver 111) is incorporated onto the IC 300 so that the corresponding phase nodes are provided as phase pins PHP1, PHP2, . . . , PHPN for configuring up to N channels or phases. A current sense resistor (RS) is provided for each channel and internally coupled to a corresponding phase pin, including a first current sense resistor RS1 coupled to phase pin PHP1, a second current sense resistor RS2 coupled to phase pin PHP2, and so on up to an Nth current sense resistor RSN coupled to phase pin PHPN. The other end of each sense resistor is coupled to a corresponding one of multiple current sense circuits 301, including a first sense circuit S1 coupled to the other end of resistor RS1, a second sense circuit S2 coupled to the other end of resistor RS2, and so on up to an Nth sense circuit SN coupled to the other end of resistor RSN. Each sense circuit 301 outputs a corresponding voltage sense (VS) signal, including a first voltage sense signal VS1 output from sense circuit S1, a second voltage sense signal VS2 output from sense circuit S2, and so on up to an Nth voltage sense signal VSN output from sense circuit SN.

Each of the voltage sense signals VS1–VSN are provided to a corresponding one of the N inputs of a multiplexer (MUX) 303 (e.g., VS1 is provided to input 1, VS2 is provided to input 2, and so on up to VSN provided to input N). The output of the MUX 303 is coupled to the non-inverting input of a gain adjust amplifier 305, having its output coupled to the gate of a variable impedance device, which is a P-channel FET (PFET) 307 in the configuration shown. The source of PFET 307 is coupled to a feedback pin 313 and to the inverting input of the voltage error amplifier 211. The amplifier 211 is configured to operate in substantially the same manner and is not further described. The feedback pin 313 is used for coupling to one end of the external feedback resistor RFB having its other end coupled to the output node 105 as previously described. The drain of PFET 307 is coupled to the inverting input of the amplifier 305 and to a gain pin 309 of the IC 300. The gain pin 309 is used for coupling to one end of an external resistor RG having its other end coupled to the VCC voltage supply. The resistance value of RG is selected to set the gain for all of the phases/channels as further described below.

The sense circuit S1 is now described, where it is understood that each of the other sense circuits 301 are configured in substantially the same manner. The other end of the first sense resistor RS1 is coupled to the inverting input of a virtual ground amplifier 321 and to the source of a controlled impedance device, which is implemented as an N-channel FET (NFET) 323 as shown. The non-inverting input of the amplifier 321 is coupled to ground, and its output is coupled to the gate of the NFET 323 at a node 326. The drain of the NFET 323 is coupled to a sample and hold circuit 324 including a current sense translation resistor 325 having a resistance value of XX, a SPST switch 327 and a capacitor 331. In particular, the drain of NFET 323 is coupled to one end of the resistor 325 and to one terminal of the switch 327, having its other terminal coupled to one end of the capacitor 331 and to an output node 329 that develops the VS1 signal. The other ends of the resistor 325 and the capacitor 331 are coupled to VCC.

For each sense circuit 301, the resistance value of the resistor RG is at a prescribed ratio relative to the value of the current sense resistors RS1–RSN, where the ratio may be the same for each channel. The sample and hold circuit 324 samples the voltage across the current sense translation resistor 325 and provides it as the corresponding VS1 signal, which is provided to the first input of the MUX 303. In a similar manner, the sample and hold circuit of each of the other sense circuits S2–SN samples the voltage across the corresponding current sense translation resistors XX and provides it as the corresponding VS2–VSN signals, respectively, provided to respective inputs of the MUX 303. The MUX 303 may operate as a time division MUX for selecting and providing each input as its output for each active channel (e.g., one at a time in sequential order), or as an averaging circuit that averages the voltages across all of the current sense translation resistors XX of the sense circuits 301 for providing an averaged voltage value to the input of the amplifier 305.

In operation, the current output of each channel/phase is fed to a corresponding one of the current sense resistors RS1–RSN. The virtual ground amplifier (e.g., amplifier 321) within the corresponding sense circuit 301 controls the corresponding controlled impedance device (e.g., NFET 323) to duplicate or otherwise represent the sensed load current through the corresponding current sense translation resistor XX, which develops a voltage representative of the voltage across the sense resistor. The proportional voltage across each current sense translation resistor XX is sampled and either time multiplexed or averaged with voltages across the other current sense translation resistors XX, and the result is provided to the input of the amplifier 305. The amplifier 305, controls the drain-source impedance of the PFET 307 to force the voltage at the pin 309 to be substantially equal to the output voltage of the MUX 303, which is proportional to the voltage across the corresponding current sense resistor RS (or proportional to the average voltage across all of the current sense resistors RS1–RSN). The gain adjust current developed through the PFET 307 is applied through the resistor RFB to adjust gain in a similar manner as previously described. In this manner, the external pins that were previously required for multiple sense resistors are eliminated. Instead, only a single pin 309 is necessary for coupling the single external gain resistor RG, which is shared among the channels.

Figure 4:
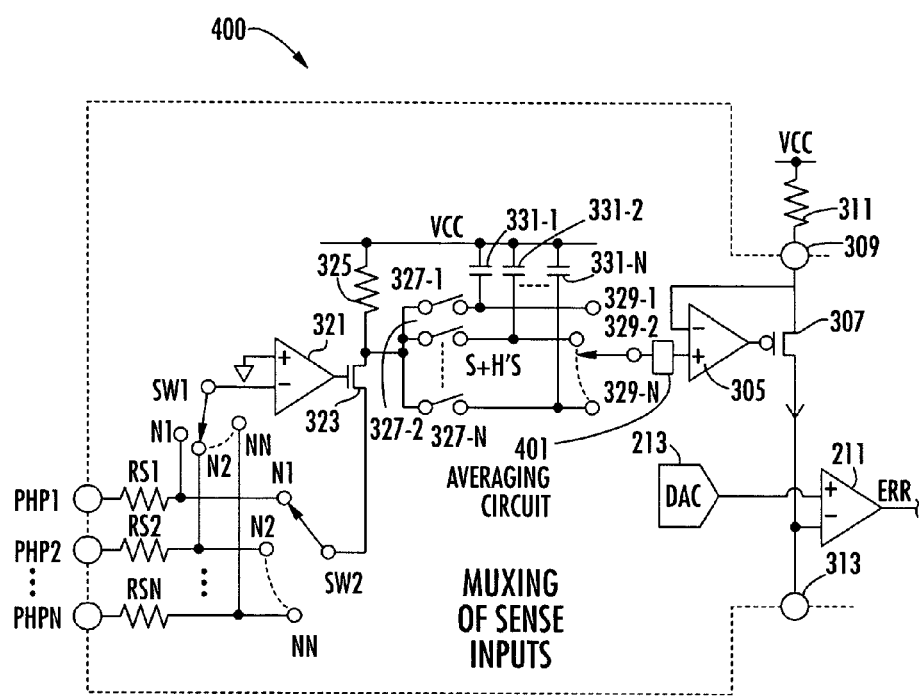
FIG. 4 is a schematic diagram of another IC of a multiphase DC-DC converter architecture incorporating a current sensing circuit implemented according to another exemplary embodiment of the present invention.

FIG. 4 is a schematic diagram of another IC 400 of a multiphase DC-DC converter architecture incorporating a multiphase converter controller implemented according to another exemplary embodiment of the present invention. The IC 400 is similar to the IC 300 in which like components assume the same or similar reference numbers. The IC 400 includes similar phase pins PHP1, PHP2, . . . , PHPN for configuring up to N channels or phases. The IC 400 also includes the current sense resistors RS1–RSN, each having one end coupled to a corresponding one of the phase pins PHP1–PHPN, respectively. In this case, the other ends of the sense resistors RS1–RSN are coupled to a corresponding one of N nodes N1–NN, respectively. The amplifier 321, the NFET 323 and the current sense translation resistor 325 are also included and coupled in substantially the same manner. Rather than duplicating these components in each of N sense circuits 301, however, only one set of these devices are included and shared among the phases/channels using select or multiplex logic as further described below. The amplifier 305, the PFET 307, the pins 309 and 313, and the resistor 311 are included and coupled in substantially the same manner.

Select or multiplexing logic is implemented using a first single-pole, N-throw switch SW1 and a second single-pole, N-throw switch SW2. The common pole or terminal of switch SW1 is coupled to the inverting input of the amplifier 321 and the common pole or terminal of the switch SW2 is coupled to the source of the NFET 323. The N select or switched terminals of each of the switches SW1 and SW2 are coupled to the nodes N1–NN, respectively, where the switches SW1 and SW2 are operated in synchronous manner with respect to each other. Thus, RS1 is selected and coupled to the amplifier 321 and the NFET 323 when the switches SW1 and SW2 select node N1, RS2 is selected and coupled to the amplifier 321 and the NFET 323 when the switches SW1 and SW2 select node N2, and so on. The switches SW1 and SW2, the amplifier 321, the NFET 323 and the resistor 325 form a switched sense amplifier circuit selectively coupled to each of the sense resistors RS1–RSN.

The switch 327 is replaced with a set of N similar SPST switches 327-1, 327-2, . . . , 327-N, each having one terminal coupled together at the junction between the resistor 325 and the NFET 323, and another terminal coupled to a corresponding one of N output nodes 329-1 to 329-N, respectively. Another single-pole, N-throw switch SW3 has a common terminal coupled to the non-inverting input of the amplifier 305 and N switched terminals coupled to the nodes 329-1 to 329-N, respectively. The capacitor 331 is replaced with N similar capacitors 331-1 to 331-N, each having one terminal coupled to VCC and another terminal coupled to the nodes 329-1 to 329-N, respectively. In this manner, the sample and hold circuits 324 distributed among the multiple current sense circuits 301 are effectively coupled to a common current sense translation resistor 325.

The IC 400 operates in a similar manner as the IC 300 using a multiplexed multiphase architecture capable of sensing current from two or more phases/channels. In this case, the components 321, 323 and 325 are shared to save semiconductor real estate and to insure better matching among the N channels. In one embodiment, the voltage sampled across the current sense translation resistor 325 for each channel is individually provided to the amplifier 305 via the switch SW3. In an alternative embodiment, an optional averaging circuit 401 is added in the path to average the voltages and to provide an averaged voltage value to the input of the amplifier 305. The switches SW1–SW3 are intended to illustrate the selection functionality and may be implemented using any suitable selection or multiplexing circuitry as known to those skilled in the art of IC fabrication. Additional functionality may be added as know to those skilled in the art, such as auto-zeroing capability (not shown) and so-called "keep-alive" circuitry (not shown) (e.g., +/−20 microampere current sources located at selected nodes to keep circuit active if/when current reverses), etc.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the appended claims.

What is claimed is:

1. A controller for a multiphase converter, comprising:
an error amplifier having an input for coupling to a feedback resistance and an output that generates an error signal based on an error voltage developed across said feedback resistance;
a gain resistor;
a current sense circuit that converts each of a plurality of sensed load currents into a corresponding one of a plurality of proportional voltages; and
a gain adjust amplifier circuit, having an input coupled to receive said plurality of proportional voltages and an output coupled to said gain adjust resistor and said error amplifier input, that applies at least one gain adjust voltage to said gain resistor to develop a gain adjust current through said feedback resistance.

2. The controller of claim 1, wherein said current sense circuit comprises:
a plurality of sense resistors, each having a first end and a second end coupled to a corresponding one of a plurality of phase nodes of the converter;
a plurality of sense amplifiers, each having a first input coupled to said first end of a corresponding one of said plurality of sense resistors and a second input coupled to a first reference voltage;
a plurality of variable impedance devices, each coupled to an output and to said first input of a corresponding one of said plurality of sense amplifiers;
a plurality of current sense translation resistors, each coupled between a corresponding one of said plurality of variable impedance devices and a second reference voltage; and
a plurality of sample and hold circuits, each coupled to a corresponding one of said plurality of current sense translation resistors for providing a corresponding one of said plurality of proportional voltages.

3. The controller of claim 1, wherein said current sense circuit comprises:
a plurality of sense resistors, each having a first end and a second end coupled to a corresponding one of a plurality of phase nodes of the controller;
a switched sense amplifier circuit, comprising:
select logic coupled to said first end of each of said plurality of sense resistors;
a sense amplifier having a first input coupled to said select logic and a second input coupled to a first reference voltage;
a variable impedance device coupled to an output and to said first input of said sense amplifier; and
a current sense translation resistor coupled between a second reference voltage and said variable impedance device; and
a plurality of sample and hold circuits, each coupled to said current sense translation resistor for providing a corresponding one of said plurality of proportional voltages.

4. The controller of claim 1, wherein said gain adjust amplifier circuit comprises:
select logic that selects among said plurality of proportional voltages;
a gain adjust amplifier having a first input coupled to said select logic and a second input coupled to said gain resistor; and
a variable impedance device having a control input coupled to an output of said gain adjust amplifier, a first current terminal coupled to said gain resistor and a second current terminal coupled to said error amplifier input.

5. The controller of claim 1, wherein said variable impedance device comprises a P-channel field-effect transistor.

6. The controller of claim 1, wherein said gain adjust amplifier circuit comprises:
select logic that time multiplexes said plurality of proportional voltages; and
a gain amplifier that controls a variable impedance device to generate said gain adjust current through said gain resistor by applying a selected proportional voltage to said gain resistor.

7. The controller of claim 1, wherein said gain adjust amplifier circuit further comprises an averaging circuit that averages said plurality of proportional voltages to provide said at least one gain adjust voltage.

8. An integrated circuit (IC) incorporating a multiphase converter controller, comprising:
a feedback pin for coupling a feedback resistor;
a gain pin for coupling a gain resistor;
an error amplifier having a first input coupled to said feedback pin and an output that provides an error signal based on a voltage across said feedback resistor;
pulse-width modulation (PWM) logic, coupled to said output of said error amplifier, that develops a plurality of PWM signals based on said error signal;
a plurality of drivers, each receiving a corresponding one of said plurality of PWM signals and each having a corresponding one of a plurality of phase nodes;
a plurality of sense resistors, each having a first end coupled to a corresponding one of said plurality of phase nodes;
a current sense circuit, coupled to a second end of each of said plurality of sense resistors, that converts a current developed through each sense resistor into a corresponding one of a plurality of proportional load voltages; and
a gain adjust current generator having an input receiving said plurality of proportional load voltages and a current-controlled output for developing a gain adjust current through said gain resistor by maintaining a selected proportional load voltage on said gain pin and applying said gain adjust current through said feedback resistor via said feedback pin.

9. The IC of claim 8, wherein said current sense circuit comprises:
a plurality of sense amplifiers, each having a first input coupled to said second end of a corresponding one of said plurality of sense resistors and a second input coupled to a first DC voltage level;
a plurality of variable impedance devices, each coupled to an output and to said first input of a corresponding one of said plurality of sense amplifiers;
a plurality of current sense translation resistors, each coupled between a corresponding one of said plurality of variable impedance devices and a second DC voltage level; and
a plurality of sample and hold circuits, each coupled to a corresponding one of said plurality of current sense translation resistors for providing a corresponding one of said plurality of proportional load voltages.

10. The IC of claim 8, wherein said current sense circuit comprises:
select logic coupled to said second end of each of said plurality of sense resistors;
a sense amplifier having a first input coupled to said select logic and a second input coupled to a first DC voltage level;
a variable impedance device coupled to an output and to said first input of said sense amplifier;
a current sense translation resistor coupled between a second DC voltage level and said variable impedance device; and
a plurality of sample and hold circuits, each having an input coupled to said current sense translation resistor and an output for providing a corresponding one of said plurality of proportional load voltages.

11. The IC of claim 8, wherein said gain adjust current generator comprises:
select logic that selects from among said plurality of proportional load voltages;

a gain adjust amplifier having a first input coupled to said select logic and a second input coupled to said gain pin; and a variable impedance device having a control input coupled to an output of said gain adjust amplifier, a first current terminal coupled to said gain pin and a second current terminal coupled to said feedback pin.

12. The IC of claim 11, wherein said select logic comprises a multiplexer that provides each of said plurality of proportional load voltages to said gain adjust amplifier one at a time.

13. The IC of claim 11, further comprising an averaging circuit coupled to said select logic that averages said plurality of proportional load voltages and that provides an average voltage to said gain adjust amplifier.

14. The IC of claim 11, wherein said variable impedance device comprises a P-channel field-effect transistor having a gate coupled to said output of said gain adjust amplifier and a drain and source coupled between said gain and feedback pins.

15. A method of adjusting gain of a multiphase power converter comprising:

generating a plurality of currents, each representative of a corresponding load current sensed at a corresponding one of a plurality of phase nodes;

applying each representative current through at least one current sense translation resistor;

sampling voltage developed across the at least one current sense translation resistor and providing a plurality of sensed voltages each representative of a corresponding load current;

selecting from among the plurality of sensed voltages to provide at least one gain adjust voltage;

applying the at least one gain adjust voltage to a gain resistor to develop a gain adjust current through the gain resistor; and applying the gain adjust current through a feedback resistor to adjust gain.

16. The method of claim 15, wherein said generating a plurality of currents comprises sensing current through a plurality of sense resistors coupled to the corresponding plurality of phase nodes with at least one virtual ground amplifier that controls at least one variable impedance device.

17. The method of claim 16, wherein said applying each representative current comprises coupling each of the at least one current sense translation resistor in series with a corresponding one of the at least one variable impedance device.

18. The method of claim 15, wherein said selecting from among the plurality of sensed voltages comprises time multiplexing.

19. The method of claim 15, wherein said selecting from among the plurality of sensed voltages comprises averaging the plurality of sensed voltages and providing an average voltage.

20. The method of claim 15, wherein said applying the at least one gain adjust voltage to a gain resistor to develop a gain adjust current through the gain resistor and said applying the gain adjust current through a feedback resistor to adjust gain comprises applying the at least one gain adjust voltage to the gain resistor through a negative feedback path of an amplifier having an output controlling a variable gain device coupled in series with the gain and feedback resistors.

* * * * *